UNITED STATES PATENT OFFICE 2,529,867

COPOLYMERS OF VINYL ESTERS OF ALIPHATIC ACIDS WITH DIALKENYL-CARBONATE ESTERS OF ALKYLENE BIS-PHENOLS

Earl J. Carlson, Akron, Ohio, assignor to The B. F. Goodrich Company, New York, N. Y., a corporation of New York No Drawing. Application May 1, 1947, Serial No. 745,256

15 Claims. (Cl. 260—77.5)

This invention relates to a class of hard, clear, non-thermoplastic, resinous copolymers and to their preparation, and pertains more particularly to copolymers of vinyl acetate or other vinyl ester of an aliphatic monocarboxylic acid, with dialkenylcarbonate esters of alkylene bis-phenols.

In copending applications, Serial Nos. 579,163, 579,164, now U. S. Patents 2,455,652 and 2,455,653 respectively, and 735,794 of James A. Bralley and Frank B. Pope, new unsaturated diesters which are capable of polymerization to form hard non-thermoplastic polymers are disclosed. Many of these unsaturated diesters possess the general formula

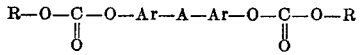

wherein R is an alkenyl radical such as allyl, methallyl, 2-ethallyl, 2-butylallyl, vinyl, isopropenyl, 3-butenyl

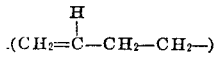

or other alkenyl group which possesses a methylene group attached by a double bond to a carbon atom, Ar is a bivalent aromatic radical having its connecting valences on nuclear carbon atoms, and A is an alkylene radical, and may be prepared by reacting any of the alkylene bis-phenols, or nuclear halogenated alkylene bis-phenols with phosgene and with an alkenol having a methylene group attached by a double bond to a carbon atom.

I have now found that the time required for polymerization of such unsaturated diester may be substantially reduced, the hardness of the resulting polymer greatly increased and the brittleness of the polymer decreased, by copolymerizing the unsaturated diester with a vinyl ester of an aliphatic acid and particularly with vinyl acetate. In addition to reduced polymerization time, increased hardness and decreased brittleness, the copolymers thus formed are unusual in that very little shrinkage, less than 9%, takes place during the polymerization. This property, of course, renders the materials very valuable for use as molding resins of the thermosetting variety, making it possible to produce molded objects of accurate dimensions free from strain, in contrast to other unsaturated diesters which shrink as much as 15 to 20% or more during the polymerization reaction and consequently find no application for this purpose.

Among the unsaturated diesters which may be polymerized with vinyl esters of aliphatic acids according to this invention, are those which possess the formula:

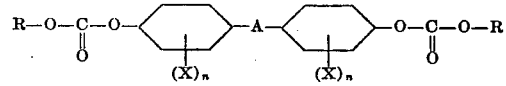

wherein R is an alkenyl radical containing a methylene group attached by a double bond to a carbon atom, A is an alkylene radical, X is a halogen, and n is an integer, including zero, less than 5. Among the compounds of this class which contain halogen are the bis-[(p-alkenylcarbonato) halophenyl] alkanes such as 2,2-bis-(-4-allyl carbonato-3,5-dichlorophenyl) propane, 2,2-bis-(-4-methallyl carbonato-3,5-dichlorophenyl) propane, bis-(-4-allyl carbonato-3,5-dichlorophenyl) methane, 2,2-bis-(-4-allyl carbonato-3,5-dichlorophenyl) butane, 2,2-bis-(-4-methallyl carbonato-3,5-dichlorophenyl) butane, 2,2-bis-(-4-allyl carbonato-3-chlorophenyl) propane, 2,2-bis-(-4-methallyl carbonato-3-chlorophenyl) propane, 1,2-bis-(-4-allyl carbonato-3,5-dichlorophenyl) propane, 1,1-bis-(-4-allyl carbonato-3,5-dichlorophenyl) heptane, 4,4-bis-(-4-allyl carbonato-3,5-dichlorophenyl) heptane, 1,2-bis-(-4-allyl carbonato-3-chlorophenyl) ethane, 2,2-bis-(-4-allyl carbonato-3-bromophenyl) propane, 2,2-bis-(-4-allyl carbonato-3-fluorophenyl) propane, 2,2-bis-(-4-allyl carbonato-3-iodophenyl) propane, and the like.

Other compounds of this class not containing halogen (i. e., X in the general formula is zero) include the bis-(p-alkenylcarbonato phenyl) alkanes such as 2,2-bis-(-4-allyl carbonato phenyl) propane, 2,2-bis-(-4-methallyl carbonato pheyl) propane, bis-(-4-allyl carbonato phenyl) methane, bis-(-4-methallyl carbonato phenyl) methane, 2,2,-bis-(-4-allyl carbonato phenyl) butane, 1,2-bis-(-4-allyl carbonato phenyl) ethane, 1,1-bis-(-4-allyl carbonato phenyl) heptane, 1,1-bis-(-4-allyl carbonato phenyl) ethane, 1,1-bis-(-4-allyl carbonato phenyl) butane, 2,2-bis-(-4-allyl carbonato phenyl) heptane, 3,3-bis-(-4-allyl carbonato phenyl) propane, 1,5- bis-(-4-allyl carbonato phenyl) pentane, and the like.

The preferred compounds of this general class are those in which A in the general formula is an alkylidene radical and R is allyl or methallyl.

In addition to the above compounds in which the aromatic group is a phenylene radical, compounds containing other bivalent aromatic radicals such as tolylene, naphthylene, and the like may also be used.

Furthermore, compounds in which the carbonate ester linkages are in the ortho- or meta- positions on the aromatic nucleus may also be used to form copolymers with vinyl acetate within the scope of this invention.

In addition to vinyl acetate, esters of other aliphatic monocarboxylic acids produce similar improvements in gel time and hardness of the resulting copolymers. Among these other esters are vinyl propionate, vinyl butyrate, vinyl valerate, vinyl caproate, vinyl heptylate, vinyl caprylate, vinyl pelargonate, vinyl caprate, vinyl undecylate, vinyl laurate and other esters of the formula

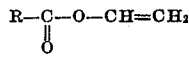

wherein R is an alkyl radical.

In the practice of the invention one or more of the above unsaturated diesters is mixed with a vinyl ester of an aliphatic acid, a catalyst added, and the mixture polymerized by heating. The amount of vinyl ester used is not critical, and may be varied considerably. In general, it is desirable to use mixtures containing from 1 to 50 percent by weight of the vinyl ester and from 50 to 99 percent by weight of the dicarbonate ester, but mixtures containing from 1 to 75 parts of the vinyl ester and from 25 to 99 parts of the dicarbonate ester may all be used depending on the particular properties desired in the copolymer. When vinyl acetate is used as a monomer, it is desirable that it be present in an amount not in excess of 30 percent by weight of the mixture, particularly if the polymerization is to be conducted at a temperature above the boiling point of vinyl acetate (72°–73° C.). However, when the polymerization temperature is below 72° C., amounts of vinyl acetate in excess of 30% may be used with good results.

The mixture of a dicarbonate ester and a vinyl ester of an aliphatic acid may be polymerized at temperatures from 25° C. to 150° C. and preferably at 50° C. to 100° C. in the presence of a polymerization catalyst, or in solution in an organic solvent or in aqueous emulsion or in any other desired manner. Preferably, the mixed monomers, which are liquid at the polymerization temperature, are mixed with catalyst and heated in a suitable form or on a casting surface until a solid, insoluble, infusible polymer is formed.

It is often desirable that the polymerization be carried out in two stages, first to form a solid gel, which may be shaped as desired and then to form the final insoluble, infusible, hard polymeric material.

The following table contains specific examples of copolymers prepared with vinyl acetate and dicarbonate esters. In examples I through X, vinyl acetate and 2,2-bis-(-4-allyl carbonato-3,5-dichlorophenyl) propane were polymerized, and in examples XI through XIX vinyl acetate and the unchlorinated dicarbonate ester, 2,2-bis-(-4-allyl carbonato phenyl) propane, were polymerized. The copolymers were prepared by heating mixtures of the dicarbonate ester with various proportions of vinyl acetate for 24 hours at 75° C. and in the presence of one percent by weight of benzoyl peroxide as catalyst. The gel time (time required for the liquid mixture to be transformed into a solid gel) and hardness of the final product were measured, and are included in the table:

*Table*

| Example | Weight Percent Vinyl Acetate | Weight Percent Dicarbonate Ester | Gel Time, minutes | Barcol Impressor Hardness |
|---|---|---|---|---|
| VINYL ACETATE AND 2,2-BIS-(-4-ALLYL CARBONATO-3,5-DICHLOROPHENYL) PROPANE ||||| 
| I | 0 | 100 | 100 | 37–40 |
| II | 1 | 99 | 95 | 40–42 |
| III | 2 | 98 | 90 | 40–42 |
| IV | 3 | 97 | 87 | 41–44 |
| V | 4 | 96 | 85 | 42–45 |
| VI | 5 | 95 | 80 | 43–45 |
| VII | 10 | 90 | 45 | 43–46 |
| VIII | 15 | 85 | 38 | 44–46 |
| IX | 20 | 80 | 29 | 45–47 |
| X | 30 | 70 | 21 | 46–48 |
| VINYL ACETATE AND 2,2-BIS-(-4-ALLYL CARBONATO PHENYL) PROPANE ||||| 
| XI | 0 | 100 | 230 | [1] 80–85 |
| XII | 1 | 99 | 195 | [1] 80–85 |
| XIII | 2 | 98 | 190 | [1] 85–90 |
| XIV | 3 | 97 | 185 | [1] 85–90 |
| XV | 4 | 96 | 180 | [1] 87–90 |
| XVI | 5 | 95 | 130 | 5–10 |
| XVII | 10 | 90 | 30 | 24–27 |
| XVIII | 20 | 80 | 25 | 30–33 |
| XIX | 30 | 70 | 18 | 33–37 |

[1] Durometer hardness, D scale.

This above table shows that as the amount of vinyl acetate is increased, the rate of polymerization also increases. It also shows the increase in hardness obtained by increasing the amount of vinyl acetate.

The copolymers prepared from vinyl acetate and the dicarbonate esters of the classes listed hereinabove have properties greatly superior to the copolymers prepared from vinyl acetate and other dicarbonate esters. For example, copolymers prepared from vinyl acetate and diallyl diethylene glycol dicarbonate show no substantial improvement in gel time, hardness, and brittleness properties over the polymer prepared from diallyl diethylene glycol dicarbonate alone.

The catalyst that is used in the polymerization may be any of the usual polymerization catalysts, preferably a peroxygen compound such as hydrogen peroxide, silver peroxide, sodium persulfate, the perborates, the percarbonates, benzoyl peroxide, caproyl peroxide, lauroyl peroxide, acetone peroxide, acetyl benzoyl peroxide and other organic peroxides and the like. The amount of catalyst can be varied considerably, depending largely on the particular qualities desired in the final polymerized product. When more than three percent of the catalyst, based on the material polymerized, is used, the resulting polymer may be slightly colored, and consequently when clear products are desired the percentage of catalyst should be kept below 3, and preferably from 0.1 to 1.0 percent, but where the slight color effect is not serious, percentages as high as 5 and even higher may be utilized.

The products of the polymerization may be cast into rigid sheets which show outstanding resistance to chemicals, abrasion, craze, and distortion under heat, and fully cured sheets can be formed at elevated temperatures into severe simple curvatures or into moderate compound curvatures. The sheets prepared from the copolymers of this invention possess outstanding flexural strength. In the following example a cast sheet of a copolymer of vinyl acetate and 2,2-bis-(-4-allyl carbonato-3,5-dichlorophenyl) propane was prepared and tested for flexural strength, flexural modulus, and energy to break.

*Example XX*

A ⅛″ x 3″ x 3″ sheet was prepared by casting a mixture of 70 parts of 2,2-bis-(-4-allyl carbonato phenyl) propane, 30 parts vinyl acetate and containing 1 part benzoyl peroxide as catalyst, and heating the casting at 60° C. for a period of twenty-four hours. Flexural tests were then conducted on the sheet and the following results were obtained:

Flexural strength _____ p. s. i.__ 16,800
Flexural modulus _____ p. s. i.__ 573,000
Energy to break_____ ft. lbs./in.³__ 3.8

The above material is substantially less brittle than the polymer prepared by the polymerization of the dicarbonate ester alone which has the following flexural properties:

Flexural strength_____ p. s. i.__ 9,240
Flexural modulus_____ p. s. i.__ 270,000
Energy to break _____ ft. lbs./in.³__ 2.5

The vinyl acetate-2,2-bis-(-4-allyl carbonato-3,5-dichlorophenyl) propane copolymer is also much less brittle than copolymers prepared from vinyl acetate and other dicarbonate esters. For example, a copolymer prepared from 30 percent vinyl acetate and 70 percent diallyl diethylene glycol dicarbonate prepared as in Example XX above possessed a flexural strength of only 8,000 p. s. i. and a flexural modulus of only 200,000 p. s. i.

Other of the polyesters listed above may also be polymerized by similar methods to give hard, clear, non-thermoplastic resins using the same or other catalysts. It is also possible to employ mixtures of two or more of these polyesters with each other in a polymerization with a vinyl ester of an aliphatic acid, as well as mixtures of these polyesters and vinyl esters with other polymerizable unsaturated compounds, as well as with plasticizers, pigments, fillers, other polymers or resins, dyes, etc.

Although specific examples of the invention have been herein described, it is not intended to limit the invention solely thereto, but to include all of the variations and modifications falling within the spirit and scope of the appended claims.

I claim:

1. A hard, clear, non-thermoplastic polymeric material prepared by the polymerization of a mixture of from 1 to 50 percent by weight of a vinyl ester of a saturated aliphatic monocarboxylic acid containing from 2 to 12 carbon atoms with from 50 to 99 percent by weight of a compound of the formula

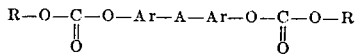

wherein R is an alkenyl radical containing from 2 to 7 carbon atoms and having a methylene group attached by a double bond to a carbon atom, Ar is a bivalent aromatic radical selected from the class consisting of arylene and nuclear halogenated arylene radicals and having its connecting valences on aromatic nuclear carbon atoms, and A is an alkylene radical containing from 1 to 7 carbon atoms.

2. A hard, clear, non-thermoplastic polymeric material prepared by the polymerization of a mixture of from 1 to 30 percent by weight of vinyl acetate and from 70 to 99 percent by weight of 2,2-bis-(-4-allyl carbonato-3,5-dichlorophenyl) propane.

3. A hard, clear, non-thermoplastic polymeric material prepared by the polymerization of a mixture of from 1 to 30 percent by weight of vinyl acetate and from 70 to 99 percent by weight of 2,2-bis-(-4-allyl carbonato phenyl) propane.

4. A polymerizable material comprising a mixture of from 1 to 50 percent by weight of a vinyl ester of a saturated aliphatic monocarboxylic acid containing from 2 to 12 carbon atoms with from 50 to 99 percent by weight of a compound of the formula

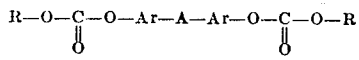

wherein R is an alkenyl radical containing from 2 to 7 carbon atoms and having a methylene group attached by a double bond to a carbon atom, Ar is a bivalent aromatic radical selected from the class consisting of arylene and nuclear halogenated arylene radicals and having its connecting valences on aromatic nuclear carbon atoms, and A is an alkylene radical containing from 1 to 7 carbon atoms, said mixture being capable of polymerization in the presence of heat and an organic peroxide catalyst.

5. A polymerizable material comprising a mixture of from 1 to 30 percent by weight of vinyl acetate with from 70 to 99 percent by weight of 2,2-bis-(-4-allyl carbonato-3,5-dichlorophenyl) propane, said mixture being capable of polymerization in the presence of heat and an organic peroxide catalyst.

6. A polymerizable material comprising a mixture of from 1 to 30 percent by weight of vinyl acetate with from 70 to 99 percent by weight of 2,2-bis-(-4-allyl carbonato phenyl) propane, said mixture being capable of polymerization in the presence of heat and an organic peroxide catalyst.

7. A method of preparing a hard, clear, non-thermoplastic copolymer which comprises mixing from 1 to 50 percent by weight of a vinyl ester of a saturated aliphatic monocarboxylic acid containing from 2 to 12 carbon atoms and from 50 to 99 percent by weight of a compound of the formula

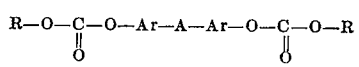

wherein R is an alkenyl radical containing from 2 to 7 carbon atoms and containing a methylene group attached by a double bond to a carbon atom, Ar is a bivalent aromatic radical selected from the class consisting of arylene and nuclear halogenated arylene radicals and having its connecting valences on aromatic nuclear carbon atoms, and A is an alkylene radical containing from 1 to 7 carbon atoms, adding a peroxygen catalyst, and heating the mixture until it is polymerized to an infusible, insoluble state.

8. A method of preparing a hard, clear, non-thermoplastic copolymer, which comprises mixing from 1 to 30 percent by weight of vinyl acetate and from 70 to 99 percent by weight of 2,2-bis-(-4-allyl carbonato-3,5-dichlorophenyl) propane, adding an organic peroxide catalyst, and heating the mixture until it is polymerized to an infusible, insoluble state.

9. A method of preparing a hard, clear, non-thermoplastic copolymer, which comprises mixing from 1 to 30 percent by weight of vinyl acetate and from 70 to 99 percent by weight of 2,2-bis-(-4-allyl carbonato phenyl) propane, adding an organic peroxide catalyst, and heating the mixture until it is polymerized to an infusible, insoluble state.

10. A hard, clear, non-thermoplastic polymeric material prepared by the polymerization of a mixture of from 1 to 50 per cent by weight of a vinyl ester of a saturated aliphatic monocarboxylic acid containing from 2 to 12 carbon atoms with from 50 to 99 per cent by weight of a bis-(-allyl carbonato halophenyl) propane.

11. A hard, clear, non-thermoplastic polymeric material prepared by the polymerization of a mixture of from 1 to 50 per cent by weight of a vinyl ester of a saturated aliphatic monocarboxylic acid containing from 2 to 12 carbon atoms with from 50 to 99 per cent by weight of a bis-(-allyl carbonato phenyl) propane.

12. A polymerizable material comprising a mixture of from 1 to 50 per cent by weight of a vinyl ester of a saturated aliphatic monocarboxylic acid containing from 2 to 12 carbon atoms, and from 50 to 99 per cent by weight of a bis-(-allyl carbonato halophenyl) propane.

13. A polymerizable material comprising a mixture of from 1 to 50 per cent by weight of a vinyl ester of a saturated aliphatic monocarboxylic acid containing from 2 to 12 carbon atoms, and from 50 to 99 per cent by weight of a bis-(-allyl carbonato phenyl) propane.

14. A method of preparing a hard, clear, non-thermoplastic copolymer which comprises mixing from 1 to 50 per cent by weight of a vinyl ester of a saturated aliphatic monocarboxylic acid containing from 2 to 12 carbon atoms, and from 50 to 99 per cent by weight of a bis-(-allyl carbonato halophenyl) propane, adding an organic peroxide catalyst, and heating the mixture until it is polymerized to an infusible, insoluble state.

15. A method of preparing a hard, clear, non-thermoplastic copolymer which comprises mixing from 1 to 50 per cent by weight of a vinyl ester of a saturated aliphatic monocarboxylic acid containing from 2 to 12 carbon atoms, and from 50 to 90 per cent by weight of a bis-(-allyl carbonato phenyl) propane, adding an organic peroxide catalyst, and heating the mixture until polymerized to an infusible, insoluble state.

EARL J. CARLSON.

REFERENCES CITED

The following references are of record in the file of this patent:

UNITED STATES PATENTS

| Number | Name | Date |
|---|---|---|
| 2,384,115 | Muskat et al. | Sept. 4, 1945 |
| 2,401,581 | Muskat et al. | June 4, 1946 |
| 2,403,112 | Muskat | July 2, 1946 |
| 2,414,400 | Strain | Jan. 14, 1947 |
| 2,455,652 | Bralley et al. | Dec. 7, 1948 |
| 2,468,975 | Held et al. | May 3, 1949 |